United States Patent
Dupuis et al.

(10) Patent No.: US 11,493,723 B2
(45) Date of Patent: Nov. 8, 2022

(54) DISTRIBUTION CABLING TAPE APPLICATION DEVICE WITH ENDOSCOPE CAMERA FOR REGISTRATION OF CABLE AND CABLING TAPE

(71) Applicant: CORNING RESEARCH & DEVELOPMENT CORPORATION, Corning, NY (US)

(72) Inventors: David Montalion Dupuis, Cedar Park, TX (US); Cary Alan Kipke, Pflugerville, TX (US); Donald Kent Larson, Cedar Park, TX (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/320,576

(22) Filed: May 14, 2021

(65) Prior Publication Data

US 2021/0271046 A1  Sep. 2, 2021

Related U.S. Application Data

(63) Continuation of application No. PCT/US2019/062226, filed on Nov. 19, 2019.
(Continued)

(51) Int. Cl.
 *G02B 6/50* (2006.01)
 *G02B 6/44* (2006.01)
(52) U.S. Cl.
 CPC .......... *G02B 6/504* (2013.01); *G02B 6/4403* (2013.01)

(58) Field of Classification Search
 CPC .............................. G02B 6/504; G02B 6/4403
(Continued)

(56) References Cited

U.S. PATENT DOCUMENTS

| 4,117,192 A | 9/1978 | Jorgensen |
| 4,129,673 A | 12/1978 | Eigenmann |

(Continued)

FOREIGN PATENT DOCUMENTS

| EP | 0644557 A2 | 3/1995 |
| FR | 2754551 A1 | 4/1998 |

(Continued)

OTHER PUBLICATIONS

International Search Report and Written Opinion of the International Searching Authority; PCT/US2018/054107; dated Jan. 11, 2019; 10 pages; European Patent Office.
(Continued)

*Primary Examiner* — Jerry M Blevins
(74) *Attorney, Agent, or Firm* — William D. Doyle (57) ABSTRACT

A device for applying a distribution cabling tape system includes a distribution cabling tape having an adhesive capable of adhering to a concrete or asphalt substrate and a distribution cable. The device includes an endoscope camera, wherein movement of the device in one direction simultaneously applies both the distribution cable and the distribution cabling tape at a location on the substrate viewable by the endoscope camera. A method for registering a cable and a cabling tape into a conduit in a concrete or asphalt substrate includes using an endoscope to view the location at which the cable and cabling tape are applied.

20 Claims, 5 Drawing Sheets

Related U.S. Application Data (60) Provisional application No. 62/773,400, filed on Nov. 30, 2018.

(58) Field of Classification Search
USPC .......................................................... 385/114
See application file for complete search history.

(56) References Cited

U.S. PATENT DOCUMENTS

| | | | |
|---|---|---|---|
| 4,282,281 A | 8/1981 | Ethen | |
| 4,388,359 A | 6/1983 | Ethen et al. | |
| 4,490,432 A | 12/1984 | Jordan | |
| 4,685,824 A | 8/1987 | Eigenmann | |
| 4,911,525 A * | 3/1990 | Hicks .................. | G02B 6/4439 385/114 |
| 4,988,541 A | 1/1991 | Hedblom | |
| 5,077,117 A | 12/1991 | Harper et al. | |
| 5,227,221 A | 7/1993 | Hedblom | |
| 5,468,159 A | 11/1995 | Brodsky et al. | |
| 5,593,246 A | 1/1997 | Hedblom et al. | |
| 5,683,746 A | 11/1997 | Hedblom et al. | |
| 5,763,000 A | 6/1998 | Hedblom | |
| 5,853,846 A | 12/1998 | Clark et al. | |
| 5,928,761 A | 7/1999 | Hedblom et al. | |
| 5,981,033 A | 11/1999 | Haunschild et al. | |
| 6,231,962 B1 | 5/2001 | Bries et al. | |
| 6,431,788 B1 | 8/2002 | Hedblom et al. | |
| 6,479,132 B2 | 11/2002 | Hedblom et al. | |
| 6,957,869 B1 | 10/2005 | Sawtelle | |
| 7,169,831 B2 | 1/2007 | Helland et al. | |
| 8,842,960 B2 | 9/2014 | Berglund et al. | |
| 9,164,251 B2 | 10/2015 | Hendrickson et al. | |
| 9,477,059 B2 | 10/2016 | Larson et al. | |
| 2012/0137510 A1 | 6/2012 | Thompson et al. | |
| 2013/0011198 A1 | 1/2013 | Pichler et al. | |
| 2013/0098557 A1 | 4/2013 | Takeuchi et al. | |
| 2014/0011911 A1 | 1/2014 | Hedblom | |
| 2014/0153893 A1 | 6/2014 | Berglund et al. | |
| 2014/0268541 A1* | 9/2014 | Coombs ............ | A61B 1/00039 361/679.41 |
| 2015/0171609 A1 | 6/2015 | Larson et al. | |
| 2017/0045416 A1* | 2/2017 | Hansen .................. | G01M 3/18 |
| 2017/0268184 A1* | 9/2017 | Loomis ............... | E01C 19/4873 |
| 2018/0017750 A1 | 1/2018 | Clatanoff et al. | |

FOREIGN PATENT DOCUMENTS

| | | |
|---|---|---|
| JP | 2006-235029 A | 9/2006 |
| WO | 2018/017475 A1 | 1/2018 |

OTHER PUBLICATIONS

International Search Report and Written Opinion of the International Searching Authority; PCT/US2019/062226; dated Jan. 23, 2020; 11 pages; European Patent Office.

Electridut Inc: "UT Wire 5 1 Cable Blanket 4-6,8 Low Profile Cord Cover and Protector, Black", Available at: https://www.amazon.com/UT-WireUTW-CPL5-BK-BlanketProtector/dp/B075726R89?th=1, Retrieved on Jul. 1, 2021, 10 pages.

\* cited by examiner

DISTRIBUTION CABLING TAPE APPLICATION DEVICE WITH ENDOSCOPE CAMERA FOR REGISTRATION OF CABLE AND CABLING TAPE

CROSS-REFERENCE TO RELATED APPLICATIONS

This application is a continuation of International Application No. PCT/US2019/062226 filed on Nov. 19, 2019, which claims the benefit of priority under 35 U.S.C. § 119 of U.S. Provisional Application Ser. No. 62/773,400 filed on Nov. 30, 2018, the content of which is relied upon and incorporated herein by reference in its entirety.

BACKGROUND

The present disclosure is directed to a distribution cabling tape application device or tool for applying distribution cabling tape and distribution cables that incorporates an endoscope camera for registration of the device in relation to certain features of an asphalt or concrete substrate to enable accurate and efficient application of the cabling tape and/or distribution cables.

Communications service providers are faced with increasing demands to deliver faster and better service to their customers. Service providers can meet these needs for greater bandwidth by incorporating fiber optics in the access network, the communication connection to the end subscriber. Service providers have announced gigabit service offerings.

With increasing competition in the industry, speed to build new networks is critical. However, the process to deploy traditional fiber optic networks often requires time consuming civil engineering work both in planning, verifying existing infrastructure location and construction. The access network can be the most burdensome in that individual fibers must connect each subscriber's living unit. In the case of single family home neighborhoods, that means a single fiber to each home.

For aerial deployments (telephone poles), deploying the fiber optic cable is relatively straight forward. Lashing the new fiber optic distribution cable to existing telephone cabling or stringing a new messenger wire in which to lash the new fiber optic cable is done relatively quickly (about a day to install the distribution cable for a serving area of 200-500 homes). However, for new entrants for fiber-to-the-home (FTTH) service, gaining access to the telephone poles from the pole owner (often incumbent telephone company) can be a time consuming and litigious process.

For below grade deployments (conduit below grade in which to pull the distribution cable) deployment can involve many construction machines and operators for weeks for a serving area of 200-500 homes. One of the most time consuming operations is directional drilling to place the conduit below grade. The cost of directional drilling is approximately $40/foot making below grade fiber access network deployment cost much more than aerial deployments.

Therefore, a need exists for a distribution cabling alternative to traditional aerial and below grade installations that can eliminate the need to share telephone poles and avoid the time consuming and costly directional drilling for conduit placement. One alternative is a distribution cabling tape system that comprises application of a polymeric cabling tape to a concrete or asphalt surface. The cabling tape adheres to the surface and provides protection for at least one distribution cable placed into a milled feature, such as a trench or groove, that is milled into the surface.

An applicator device may be used to both place the cable into the milled feature and apply the cabling tape to the surface in a single pass. However, there is a need for the applicator device to have means for registering the location of the milled feature in relation to the applicator device so that the applicator device appropriately and efficiently places the distribution cable and/or cabling tape with respect to the milled feature.

SUMMARY

In accordance with aspects of the present disclosure, a device for applying a distribution cabling tape system includes a distribution cabling tape having an adhesive capable of adhering to a concrete or asphalt substrate and a distribution cable. The device includes an endoscope camera, wherein movement of the device in one direction simultaneously applies both the distribution cable and the distribution cabling tape at a location on the substrate viewable by the endoscope camera. A method for registering a cable and a cabling tape into a conduit in a concrete or asphalt substrate includes using an endoscope to view the location at which the cable and cabling tape are applied.

In accordance with aspects of the present disclosure, a method for registering a cable into a conduit in a concrete or asphalt substrate includes providing a device for placing a distribution cable into the conduit, wherein the device has a distribution cable housing and distribution portion that houses a spool of distribution cable, and an endoscope camera. The method includes moving the device in one direction such that the device positions the distribution cable into the conduit at a predetermined location; and viewing images of the predetermined location provided by the endoscope camera.

The above summary of the present disclosure is not intended to describe each illustrated embodiment or every implementation of the present invention. The figures and the detailed description that follows more particularly exemplify these embodiments.

BRIEF DESCRIPTION OF THE DRAWINGS

The present disclosure will be further described with reference to the accompanying drawings, wherein.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present disclosure can be positioned in a number of different orientations, the directional terminology is used for purposes of illustration and is in no way limiting. It is to be understood that other embodiments may be utilized and structural or logical changes may be made without departing from the scope of the present disclosure.

Figure 1:
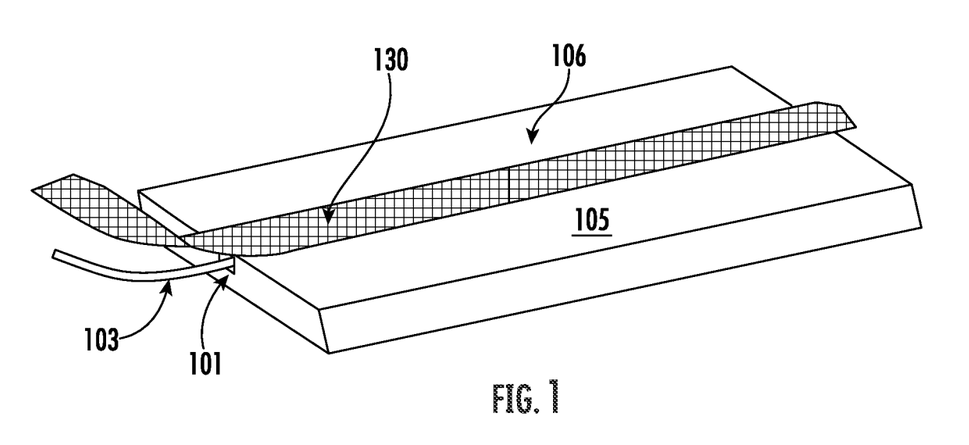
FIG. 1 illustrates a cabling tape and distribution cable as applied to a substrate surface, in accordance with aspects of the present disclosure.
Figure 2:
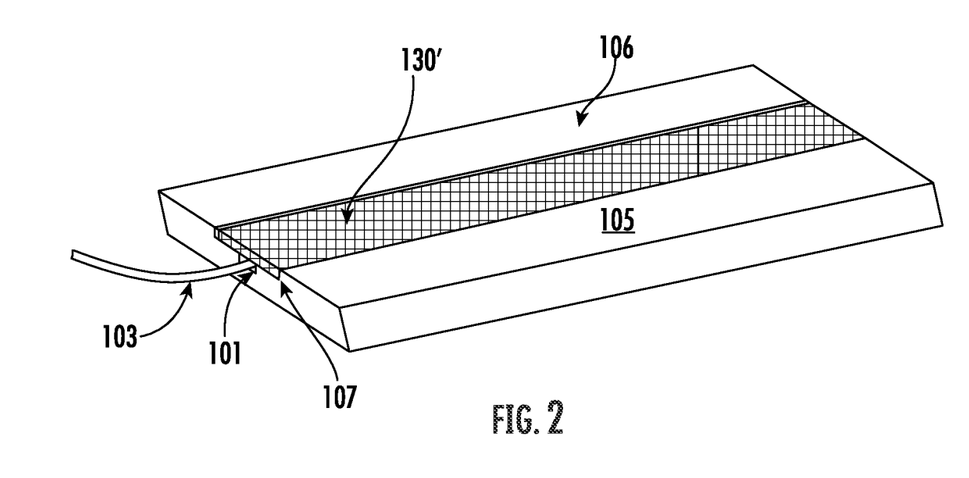
FIG. 2 illustrates another cabling tape and distribution cable as applied to a substrate surface, in accordance with aspects of the present disclosure.

As shown in FIGS. 1 and 2, the present disclosure is directed to a durable, protective distribution cabling tape 130, 130' that covers and protects a conduit 101 into which a distribution cable 103 may be placed. The conduit 101 may be in the form of a milled trench or groove feature in an asphalt or concrete substrate 105, although any suitable conduit is contemplated, such as troughs or expansions joints between the roadway and a curb or sidewalk, for example, in which the conduit does not require separate milling to receive the distribution cable 103. The distribution cabling tape 130, 130' is configured to adhere to the asphalt or concrete surface, such as a road, curb, walkway, bridge support, building base or other foundation. As shown in FIG. 1, the distribution cabling tape 130 may be affixed to an upper surface 106 of the substrate 105 and designed to cover the conduit 101 while rising above the road. However, as shown in FIG. 2, in accordance with yet other aspects of the present disclosure, the substrate 105 may be formed with or milled to include a recessed area 107 that may be wider than a width of the conduit 101, below the upper surface 106 of the substrate 105 and above a lower surface of the conduit 101. As such, the distribution cabling tape 130' may be formed to substantially occupy the recessed area 107 such that an exposed surface 131' of the cabling tape 130' may sit substantially flush with the upper surface 106 of the substrate 105. The distribution cabling tape 130, 130' may include an adhesive layer that is capable of adhering to the substrate 105, including the capability to adhere to a concrete or asphalt (or asphalt-concrete hybrid) surface, such as a road, curb or walkway surface, or any other suitable substrate surface, such as cobblestone or brick, for example. In accordance with other aspects of the present disclosure, in addition to or in lieu of an adhesive layer on the cabling tape, an adhesive compound may be applied to the substrate 105 separately from the cabling tape 130, 130' and the tape pressed into the adhesive for bonding to the substrate 105.

In accordance with other aspects of the present disclosure, the conduit 101 may be adhesive free. In accordance with yet other aspects, the conduit 101 may include some amount of adhesive to assist in holding the distribution cable in place during deployment and/or to provide a water sealant or water blocking material. The adhesive may be provided in the conduit 101 throughout a full length of the conduit 101 or at selective points or regions along the length of the conduit 101. An exemplary sealant can comprise, for example, Safetrack™ MTI sealant available from StirlingLloyd Polychem Ltd (UK).

It is noted that while structures 130, 130' are referred to herein as a "tape" or "system," this term is not meant to exclude other types of adhesive-coated structures, such as adhesive-coated road patches, panels or markers that can provide protection for optical fiber cable pathways. Although referred to herein primarily with respect to optical fiber cables, the distribution cabling tape can also be used to provide a protective pathway for electrical or power lines that are to be distributed through a neighborhood, or across a road, curb, street, parking lot or sidewalk, or for cabling repairs and/or splices. Moreover, the adhesive can be selected to provide either a temporary or more permanent type of bond to the road, curb, or walkway, thus providing a distribution cabling solution for short term events (such as concerts, sporting events, festivals, and the like), or for more longer duration deployment situations (such as subdivisions in development). In addition, while the tape embodiments described herein are often used in road, curb, sidewalk, or street applications, in alternative embodiments, the distribution cabling tape can be used to distribute cabling along other surfaces, such as along or up the side of a building, bridge, or other structures. Further, while cable 103 is described herein as a distribution cable, the disclosure contemplates routing and protection of many different types of cables or devices, including communication cables, power cables (such as low voltage power cables), sensor wires, co-axial cables, signal cables, and other conventional cables, or other types of equipment, such as sensors, RFID tags, embedded antennas, antenna feeds, and location markers.

Conduit 101 may be formed with a conventional road surface grinding tool, such as a Graco GrindLazer Model 630. In one example, the conduit 101 may be a surface channel having a width and depth of about ¼"-1" to receive a conventional fiber drop cable, such as the ROC™ Drop Dielectric Cable (available from Corning Optical Communications, LLC, Hickory N.C.). In this aspect, the conduit 101 may have a width and depth sufficient to allow the distribution cable to "float" within the pathway as the road expands and contracts with daytime heating and seasonal temperature changes.

Figure 3:
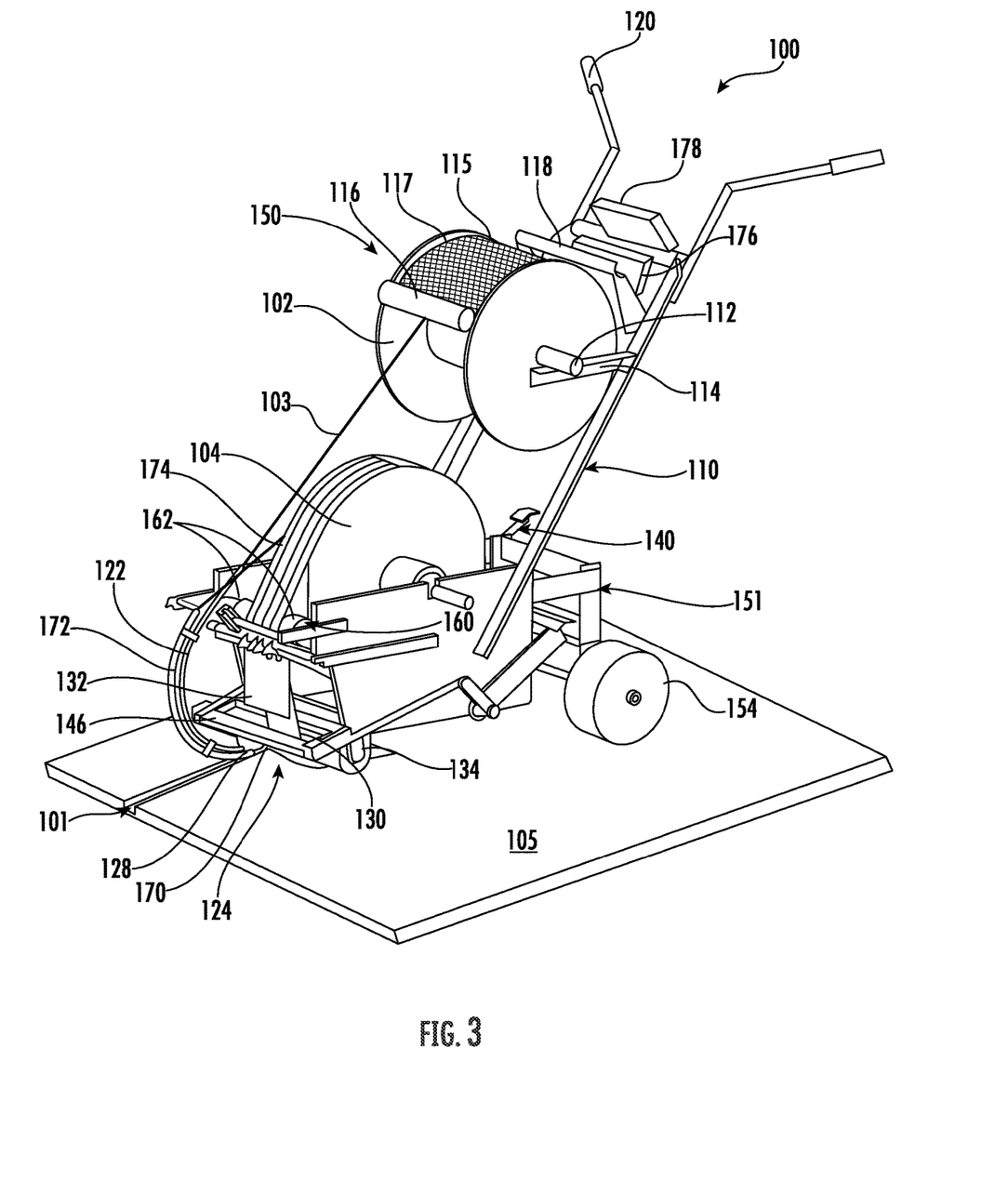
FIG. 3 is a view of device for applying a distribution cabling tape and distribution cable in accordance with aspects of the present disclosure.

As shown in FIG. 3, the distribution cable 103 and the distribution cabling tape 130 can be applied to the substrate 105 using an applicator machine or device 100. Although shown with respect to cabling tape 130 and a uniform conduit 101, the methods and apparatus disclosed may use any suitable cabling tape, including the tape 130' shown in FIG. 2. In addition, the methods and apparatus apply to other suitable substrate configurations, including that with a recessed area as also shown in FIG. 2.

Device 100 can simultaneously apply both distribution cable 103 and the road tape 130 in a single pass. By pushing the device 100 forward, a continuous cable and tape payout and lamination process can occur. In addition, device 100 can be configured with a single front wheel that helps allow for turning during the application process, so that a turning radius down to at least 6 feet can be achieved. In addition, device 100 can be manually operated using a manual pushing force or it can be a motor assisted or driven device.

The device 100 includes a cabling tape housing and distribution portion 104 that houses a spool of distribution cabling tape 130. The device 100 also includes a distribution cable housing and distribution portion 150 that houses a cable spool 102, which may preferably provide a predetermined length of an optical fiber cable 103, for example.

In this example, the cable spool 102 may be mounted onto frame 110 by a cable spool support rod 112 removably supported by arms 114 and low friction bushings (not shown). Cable spools 102 of about 2000 feet or more may be easily mounted onto the device 100. By locating the cable spool 102 on frame 110 above the cabling tape housing and distribution portion 104, the footprint of the device 100 may be more compact than if cable spool 102 and cabling tape housing and distribution portion 104 are situated horizontally one behind the other.

In accordance with other aspects of the disclosure, the cable 103 may be fed to device 100 from a separate storage location or apparatus. For example, a separate spool holder (not shown), which for example may be a cart or trailer, may be attached to the device 100 or incorporated into or attached to the motorized attachment 152 to supply longer lengths of cable 103 than can be effectively held by the device 100. Other aspects may include laying the cable ahead of device 100, wherein the cable 103 is fed to the device 100 from forward of the device 100. Serpentine rollers or any other suitable guide mechanisms to feed the cable 103 toward the cable placement area 124 may be provided on the frame 110.

Device 100 may also include a cable holding mechanism 115, such as a weight bar 116 and plastic mesh 117, which may be a spring-loaded netting, for example. The distribution or drop cable 103 may be stiff or shape-conformed due to spooling, which may snag if not maintained in position with compression and/or tension. Accordingly, the cable holding mechanism 115 provides a mean of maintaining a relative position of the cable 103 during unspooling to provide a constant force on the cable 103 so that distribution cable does not inadvertently deploy. The frame 110 may include a holding mechanism support 118. The weight bar 116 and mesh 117 may be lifted and moved to a location supported by the holding mechanism support 118 to allow for rapid spool 102 changes.

Handle bars 120 may be incorporated into the frame 110 or separately provided to attach to the frame 110. Handle bars 120 may extend outward at an angle, such as about 45°, to provide greater leverage to an operator to turn and steer the machine, avoiding operator fatigue. In addition, the positioning and angle of the handle bars 120 are such that during operation, when the device 100 is attached to a motorized guide vehicle, the ergonomics of the handle bars ensure the operator may remain seated comfortably and operate the device 100 without strain or discomfort.

Figure 4:
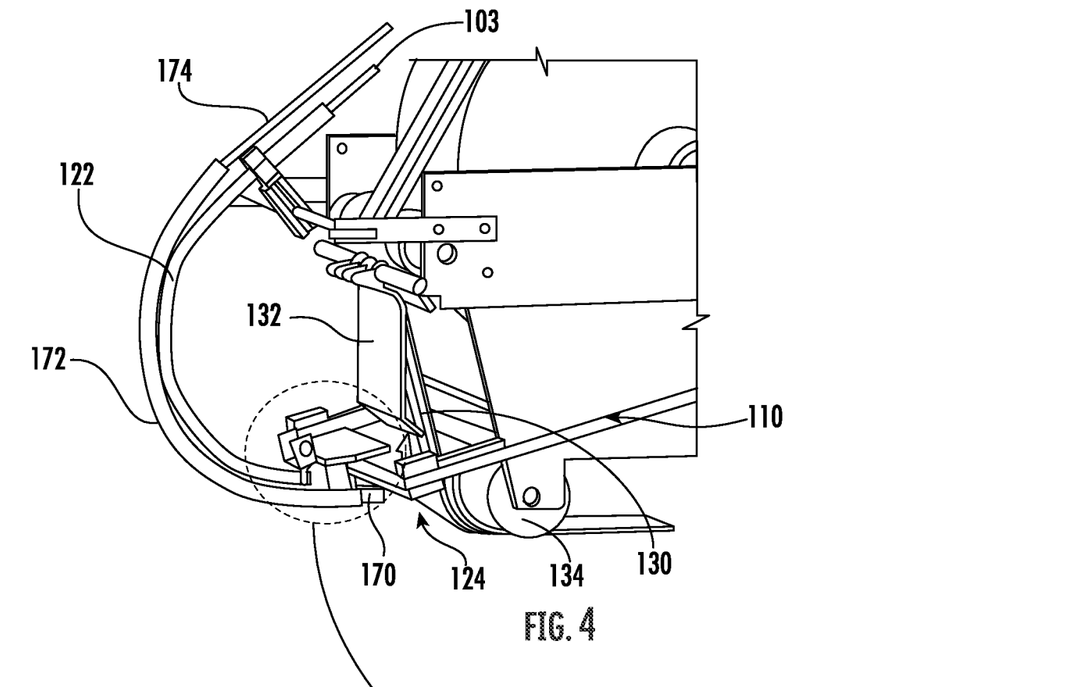
FIG. 4 is a sectional view of a front portion of the device shown in FIG. 3.
Figure 5:
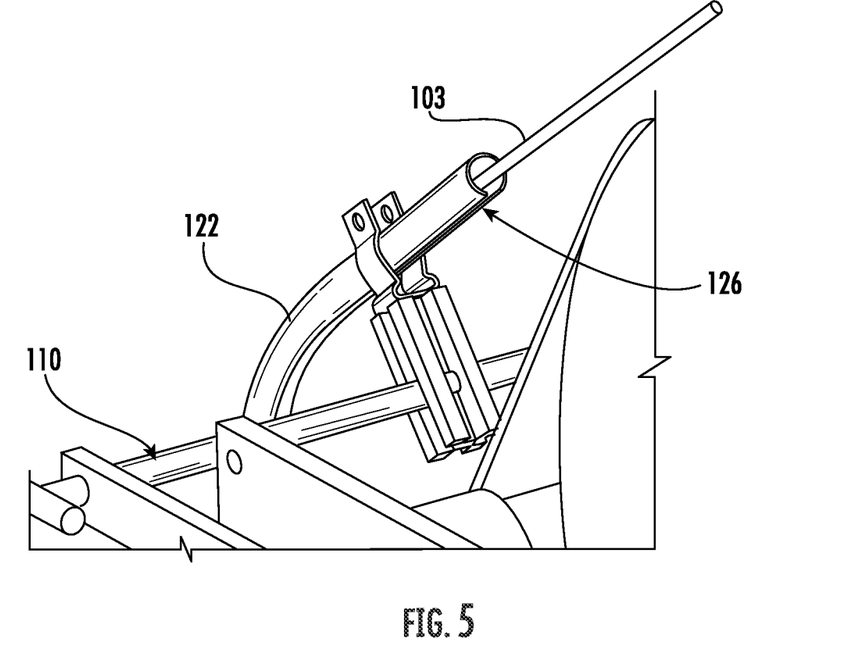
FIG. 5 is a close-up sectional view of aspects of the device shown in FIG. 3, including a cable guide, in accordance with aspects of the disclosure.

As shown in FIGS. 3 through 5, the distribution cable 103 may be fed from the spool 102 into a cable guide 122 to change the direction of the cable with low friction as the cable 103 is paid out from the cable spool 102 toward a cable placement area 124. The cable guide 122 may be a tube, for example, made of metal, a hard polymer, or any other suitable material that is removably attached to the frame 110. The cable guide 122 constrains and guides the cable 103 for efficient and consistent placement toward the cable placement area 124. As shown in FIG. 5, the cable guide 122 may be formed to include a longitudinal gap 126 that allows the cable to be removed from the device 100 without having to cut the cable 103 to do so. Although shown with the longitudinal gap 126 provided on an inner radial surface of the cable guide 122, the longitudinal gap 126 may be provided longitudinal along any side of the cable guide 122, such as the radial outer surface of the cable guide 122 or either longitudinal side surface of the cable guide 122. Particularly at transition from cabling distribution tape 130 to a drop cable burial, for example, it is desirable to remove the cable spool 102 from the machine without cutting the cable 103. The longitudinal gap 126 allows the cable 103 to be removed from the device 100 without having to cut the cable. In this regard, the cable 103 may be removed from device 100 and a slack amount of cable 103 for a drop, for example, may be run off of the spool 102 before a cut is made in the cable.

Figure 4A:
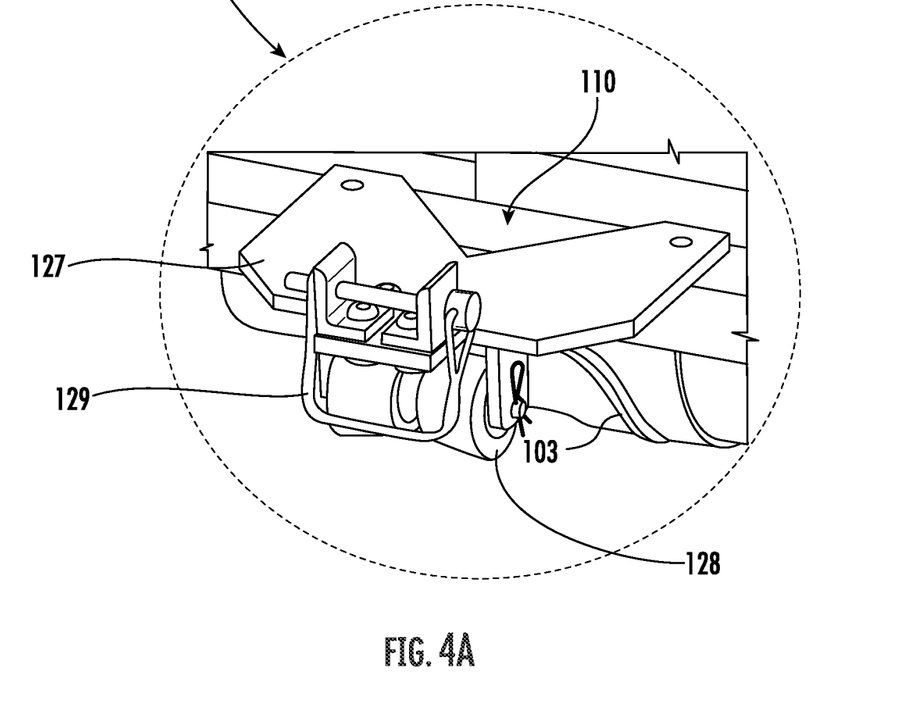
FIG. 4A is a close-up view of cable guide components in accordance with aspects of the present disclosure.

A guide roller 128 may be provided to further direct the cable 103 efficiently toward the cable placement area 124 once the cable exits the cable guide 122. In accordance with yet other aspects of the present disclosure, as shown in the close-up of FIG. 4A, a front guide plate 127 may be incorporated into or attached to the frame 110 to support the guide roller 128 and further assist in directing the cable 103 toward the cable placement area 124. As shown in FIG. 4A, the guide roller 128 may be removable and may comprise two compressible roller portions and a central slot for guiding the cable, or may be formed of a single body portion containing a central groove or valley for guiding the cable 103 toward the cable placement area 124. Different guide rollers 128, for example, with different sized slots or valleys, may be used to accommodate different sized cables. A removable arm bar 129 may be mounted onto the front guide plate to further constrain and guide the cable 103 toward the cable placement area 124.

In accordance with other aspects of the disclosure, a tape feed mechanism 132 may be provided that is integral with or attached to a leading edge of the road tape housing and distribution portion 104. The tape feed mechanism 132 may be retractable such that when loading a new tape reel, or when a cut has been made in the tape 130, the tape feed mechanism 132 may be extended to allow the tape 130 to be pulled from a forward exit portion of the road tape housing and distribution portion 104 without the adhesive from the tape sticking to or gumming up aspects of the road tape housing and distribution portion 104, the frame 110, or other components of the device 100 until the end portion of the tape 130 is attached to the road surface 105. The tape feed mechanism 132 may be provided with a low friction coating, such as Teflon or some other suitable material, for example, to provide the necessary protection without the tape sticking to the tape feed mechanism.

In accordance with yet other aspects of the present disclosure, the tape feed mechanism 132 may be provided with a coating or other mechanical means to provide a controlled bond to the tape 130, such that the tape feed mechanism 132 may be attached at or toward a distal end or tongue portion of the tape 130 where the distal end or tongue portion of the tape 130 exits the cabling tape housing and distribution portion 104. The tape may be extended from the road tape housing and distribution portion 104 until the tape 130 is positioned for attachment to the substrate 105 just prior to the primary roller 134. Upon proper positioning, the tape feed mechanism 132 may be released or detached from the end of the tape 130 and the end of the tape attached to the substrate 105. Once the end of the tape 130 is attached to the road surface 105, the tape feed mechanism 132 may be retracted or stored separated from the tape 130 now traversing past the tape feed mechanism 132 as the cable 103 and tape 130 are paid out.

Figure 6:
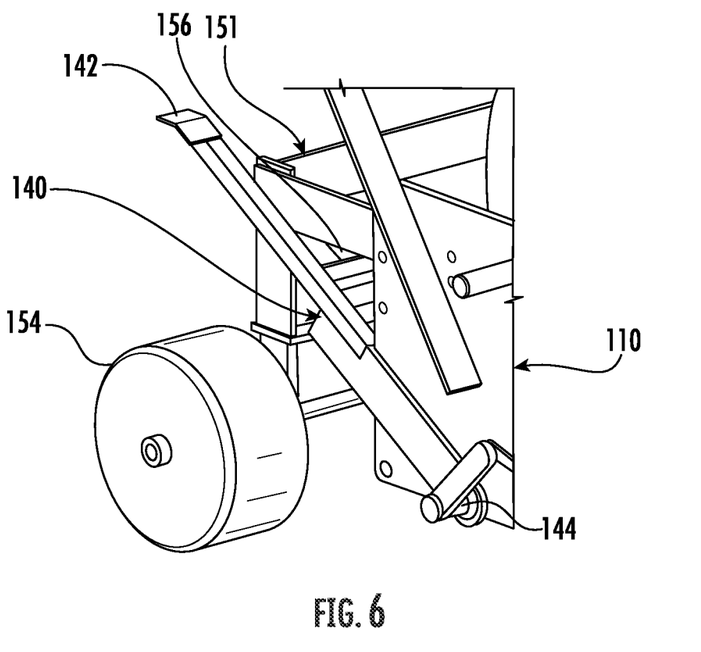
FIG. 6 is a close-up sectional view of more aspects of the device shown in FIG. 3, including a cut apparatus, in accordance with aspects of the disclosure.

As shown in FIG. 3 and closeup in FIG. 6, the device 100 may be provided with a cut apparatus 140 that extends from the frame 110 toward the rear of the device 100. The cut apparatus 140 is situated to a side of a motorized attachment frame 151 provided toward a rear portion of the device 100. Thus, when a motorized attachment, such as Graco Line Driver HD Model 262005, is used with the device 100, the cut arm apparatus 140 clears the motorized attachment 152. The cut apparatus 140 includes a cut arm 140 attached to a linkage system 144. The cut arm 142 is cantilevered toward the rear of the device 100 such that an operator walking behind or an operator of a motorized attachment attached to the device 100 can easily apply pressure with a foot, for example, to the cut arm 142. The cut arm 142 will in turn operate a cut blade 146 (see FIG. 3) through the linkage system 144 that cuts the tape 130 when desired.

In accordance with yet other aspects of the present disclosure, as shown in FIG. 6, the device 100 may include wheels 154 mounted on the attachment frame 151. Combined with the primary roller 134, the device 100 is mobile during simultaneous application of the distribution cable 103 and the cabling tape 130. The device 100 is weighted such that the primary roller 134 applies pressure to the cabling tape 130 to bond to the cabling tape 130 to the substrate 105 during application. A secondary weight component may be used to further compress the roadway tape 130 into the substrate 105 following application by the device 100. As shown in FIG. 3, a tape roll idler 160 having integrated tape edge guides 162 may be mounted onto the frame 110. The tape edge guides 162 have an outside diameter that ensures the tape 130 is properly situated between the guides 162 does not jump or substantially move during installation.

A hitch component, not shown, may be integral with or attached to the attachment frame 151 such that a motorized attachment may be easily attached to and used with the device 100. The device 100 may thus be pushed by the motorized attachment to reduce or eliminate operator fatigue. Moreover, due to the weight and friction of the device 100 while placing tape 130 and cable 103, considerable axial force is required to move the device 100 forward during operation. Particularly where longer applications are required, use of the motorized attachment may be desirable.

As shown in FIGS. 3 and 4, the cable 103 may be directed either toward the road surface 105 or directly onto the tape 130. The cable 103 may thus be accurately placed onto the road or directly onto the tape such that the cable 103 situates into the center channel of the cabling tape 130, including in situations wherein the device 100 is making radius turns on the surface of the substrate 105 as low as 10 feet. This allows efficient placement of the distribution cable 100 and road tape 130 around street corners or road obstacles such as manhole covers, for example, without having to stop or reset the device 100.

Figure 7:
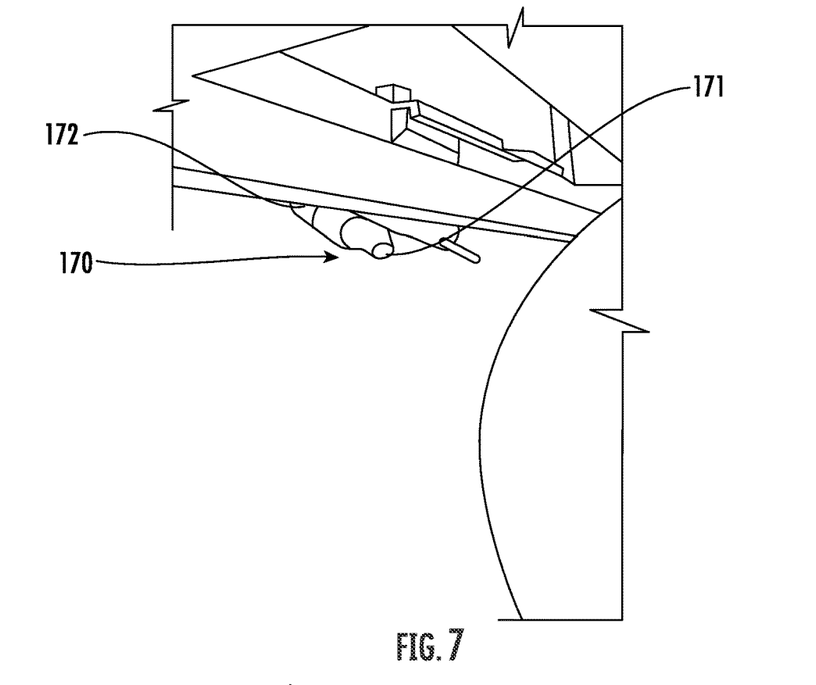
FIG. 7 is a close-up sectional view of aspects of the device shown in FIG. 3, including an endoscope camera, in accordance with aspects of the disclosure.

Because of the configuration of device 100, the machine operator may have an obstructed view of the cable placement area 124 and/or the conduit 100 in the substrate 105, for example. In accordance with yet other aspects, as shown in FIG. 3, an endoscope camera 170 may be provided to enable an operator of the device 100 to more easily view the cable placement area 124 during use. The endoscope camera 170 may be positioned to extend from a distal end of an endoscope routing tube 172 (see also FIGS. 4 and 7). The endoscope routing tube 172 may be permanently or removably attached to the cable guide 122, for example, or mounted directly to a portion of the frame 110. An endoscope cable 174 can be seen entering the top of the endoscope routing tube 172. The endoscope cable 174 connects the camera 170 to a power source and controller 176. Configured as such, the endoscope camera 170 is oriented to provide a direct view of the cable 103 and cabling tape 130 on the primary roller 134 as well as a view of the substrate 105. As shown in FIG. 7, The endoscope camera 170 may be provided with a visibility enhancement feature 171, such as a ring of LED lights surrounding the camera 170 that can be adjusted for brightness.

Figure 8:
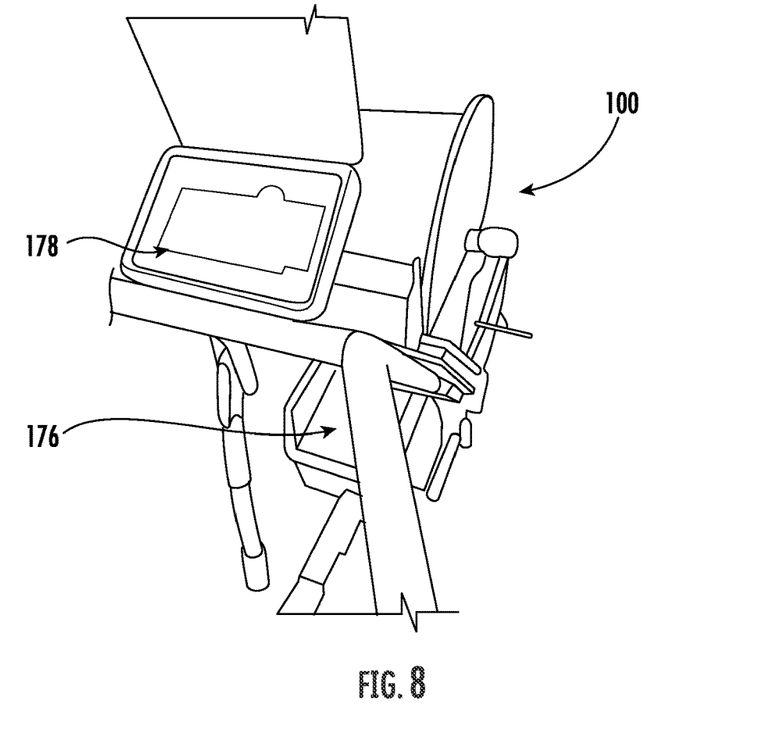
FIG. 8 is a close-up sectional view of aspects of the device shown in FIG. 3, including an endoscope control unit and user interface, in accordance with aspects of the disclosure.

As shown in FIG. 8, the endoscope camera 170 may be directly connected to a user interface 178 that may be mounted on the handle bars 120, for example. The user interface 178 may be a cell phone, for example, that can be used to view the images and control the endoscope camera 170 and any related features through a software application. For example, the user interface may be used to easily modify the viewing angle/distance of the camera 170 during operation of the device 100. The user interface 178 may connect to the controller 176 via WiFi or Bluetooth for example.

The endoscope camera 170 provides an operator the ability to accurately and efficiently ensure placement of the cable 103 into the conduit 100 and/or application of the cabling tape 130 into the recessed area 107 (see, e.g., FIG. 2). The ability to easily position the camera into a variety of positions and to control the image display using a standard cellular phone makes this a versatile tool for an operator. The endoscope also possesses the advantages of simplicity and requires minimal space toward the front of the device 100.

An example of a wireless endoscope camera 170 is the Depstech 1200P Semi-Rigid Wireless Endoscope. The camera provides a 16-inch focal distance and is equipped with a 33-foot snake cable. Image viewing is enabled by WiFi for both Android and IOS Smart Phone tablet.

An operator may want to change the viewing aspect of the camera image depending on the task. Registering the cabling tape 130 and cable 103 into the conduit 101 and/or recessed area 107 of the substrate 105 that is substantially straight (no curves) may only require visualization directly in front of the primary roller 134. When registering the cabling tape 130 and cable 103 into the conduit 101 and/or recessed area 107 of the substrate 105 with a radius turn it may be desirable to expand the camera angle so that there is a greater viewing distance in front of the primary roller 134. This allows the operator to react to the direction change and steer the applicator appropriately.

It is beneficial to have the camera 170 positioned so that a single point of reference can be used to register the cabling tape 130 and cable 103 within the conduit 101 and/or recessed area 107 of the substrate 105. In accordance with aspects of the present disclosure, the point of reference could be the recessed slot or conduit 101 for housing the cable 103 or one edge of the grinded surface of the pavement for alignment with the tape. We approximate that the allowed variation required for the laminator to place the cable and tape to the milled grooves in the road is +/−0.125 inches.

Alternative techniques can be considered for accurate placement of the cable and tape using the motorized applicator 100. Physical optics such as lenses and mirror combinations are useful across many industries to view challenging locations. A periscope would allow viewing in the target region, yet it would require several sets of aligned optics. A convex mirror placed in front of the primary roller would require a second mirror to view around the cable spool. These options have the benefit of no electronics or power required.

While a preferred application of the distribution cabling tape is for telecommunication applications, as mentioned previously, other applications can include pathways for power, sensors or sensing or electronics for smart road applications.

Various modifications, equivalent processes, as well as numerous structures to which the present disclosure may be applicable will be readily apparent to those of skill in the art to which the present disclosure is directed upon review of the present specification.

We claim:

1. A device for applying a distribution cabling tape system that includes a distribution cabling tape having an adhesive capable of adhering to a concrete or asphalt substrate and a distribution cable, the device comprising:
    a tape housing and distribution portion housing an amount of distribution cabling tape having at least one adhesive surface,
    a distribution cable housing and distribution portion that houses a spool of distribution cable, and
    an endoscope camera, wherein movement of the device in one direction simultaneously applies both the distribution cable and the distribution cabling tape at a location on the substrate viewable by the endoscope camera.

2. The device of claim 1, wherein the location on the substrate comprises a conduit.

3. The device of claim 2, wherein the conduit is a milled slot.

4. The device of claim 1, further comprising:
    a cable application guide disposed at or near the distribution cabling tape housing and distribution portion in order to guide the cable to the proper position with respect to the distribution cabling tape being deployed.

5. The device of claim 4, further comprising:
    an endoscope routing tube attached to the cable application guide for routing an endoscope cable from the endoscope camera through the endoscope routing tube.

6. The device of claim 5, further comprising:
    an endoscope control unit, wherein the endoscope cable connects the endoscope camera to the endoscope control unit.

7. The device of claim 6, further comprising:
    a user interface for controlling the endoscope camera and viewing images provided by the endoscope camera.

8. The device of claim 7, wherein the user interface is a cell phone that communicates wirelessly with the endoscope control unit.

9. The device of claim 1, further comprising:
    a visibility enhancement feature to adjust brightness at the location on the substrate.

10. The device of claim 9, wherein the visibility enhancement feature is a ring of LED lights surrounding the endoscope camera.

11. A method for registering a cable into a conduit in a concrete or asphalt substrate, the method comprising:
    providing a device for placing a distribution cable into the conduit, wherein the device comprises:
    a distribution cable housing and distribution portion that houses a spool of distribution cable, and
    an endoscope camera;
    moving the device in one direction such that the device positions the distribution cable into the conduit at a predetermined location; and
    viewing images of the predetermined location provided by the endoscope camera.

12. The method of claim 11, wherein the device further comprises a distribution cabling tape having an adhesive capable of adhering to the concrete or asphalt substrate, and wherein the method further comprises:
    applying the distribution cabling tape to the substrate to cover the conduit at the predetermined location.

13. The method of claim 12, wherein the substrate further comprises a recessed area, the method further comprising:
    applying the cabling tape into the recessed area to cover the conduit at the predetermined location.

14. The method of claim 11, wherein the conduit is a milled slot.

15. The method of claim 11, wherein the device further comprises a cable application guide, the method further comprising:
    guiding the distribution cable to the predetermined location with the cable application guide.

16. The device of claim 15, further comprising:
    attaching an endoscope routing tube to the cable application guide and routing an endoscope cable from the endoscope camera through the endoscope routing tube.

17. The method of claim 16, further comprising:
    providing an endoscope control unit and connecting the endoscope camera to the endoscope control unit.

18. The method of claim 17, wherein the device further comprises a user interface, the method further comprising:
    controlling the endoscope camera and viewing images provided by the endoscope camera via the user interface.

19. The method of claim 18, wherein the user interface is a cell phone that communicates wirelessly with the endoscope control unit.

20. The method of claim 11, wherein the device further comprises a visibility enhancement feature to adjust brightness at the location on the substrate.

* * * * *